(12) United States Patent
Larios, Jr. et al.

(10) Patent No.: US 8,156,065 B1
(45) Date of Patent: Apr. 10, 2012

(54) DATA STRUCTURE BASED VARIABLE RULES ENGINE

(75) Inventors: Robert C. Larios, Jr., Overland Park, KS (US); Angela M. Nguyen, Lenexa, KS (US); Michael J. Sanders, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 913 days.

(21) Appl. No.: 12/165,124

(22) Filed: Jun. 30, 2008

(51) Int. Cl.
*G06F 17/00* (2006.01)
*G06N 5/02* (2006.01)
(52) U.S. Cl. ............... 706/47; 706/46; 706/61
(58) Field of Classification Search ............... None
See application file for complete search history.

(56) References Cited

U.S. PATENT DOCUMENTS

| | | | |
|---|---|---|---|
| 2002/0183982 | A1 | 12/2002 | Rauscher |
| 2003/0154406 | A1* | 8/2003 | Honarvar et al. ............ 713/201 |
| 2004/0234936 | A1* | 11/2004 | Ullman et al. ............... 434/322 |
| 2005/0065865 | A1* | 3/2005 | Salomon et al. ............... 705/35 |
| 2005/0114829 | A1 | 5/2005 | Robin et al. |
| 2006/0218115 | A1* | 9/2006 | Goodman et al. ............ 707/1 |
| 2006/0218278 | A1 | 9/2006 | Uyama et al. |
| 2007/0073576 | A1 | 3/2007 | Connors et al. |
| 2008/0154693 | A1 | 6/2008 | Bateni et al. |

OTHER PUBLICATIONS

Larios, Jr., Robert C., et al., Patent Application entitled, "Managing Marketing Resources Capacity," filed Apr. 30, 2008, U.S. Appl. No. 12/113,184.
Office Action dated Jun. 6, 2011, U.S. Appl. No. 12/113,184, filed Apr. 30, 2008.
Berenson, M. L., et al., "Basic Business Statistics: Concepts and Applications," 2005, pp. 549-634, 8th Edition, Pearson/Prentice Hall, USA.
Kerzner, Harold, "Project Management: A Systems Approach to Planning, Scheduling, and Controlling," 2001, pp. 82-84, 7th Edition, John Wiley & Sons, USA, Canada.
Final Office Action dated Feb. 1, 2012, U.S. Appl. No. 12/113,184, filed on Apr. 30, 2008.

* cited by examiner

*Primary Examiner* — Jeffrey A Gaffin
*Assistant Examiner* — Adrian Kennedy (57) ABSTRACT

A system is provided for managing a data structure based variable rules engine. The system includes a processor, a set of questions, a variables data structure comprising values and a set of variables, a results data structure comprising a set of requirements, a user interface, and a rules engine. The user interface outputs the set of questions and receives responses to the set of questions. The rules engine, when executed by the processor, assigns results to the set of variables by combining the responses with the values in the variables data structure, and determines whether the results meet the set of requirements in a results data structure. The set of questions, values, responses, and results are associated with a plurality of time frames. The user interface also outputs the results for the plurality of time frames in response to a determination that the results meet the set of requirements.

7 Claims, 4 Drawing Sheets

| Number | Question | Responses |
|---|---|---|
| 1 | Sponsoring VP? | Jeff, Tim |
| 2 | Sponsoring Pipeline? | Consumer, Business, Local |
| 3 | Initiative Owner? | Anna, Maria |
| 4 | Bill Insert? | Yes, No |
| 5 | Direct Mail? | Yes, No |
| 6 | Newsletter Online? | Yes, No |
| 7 | Type of Direct Mail Program? | Grand Opening, National |

Fig. 3

| Group | Type | Variable | Number | Response | Question | Value | Assign |
|---|---|---|---|---|---|---|---|
| MRKT | Arithmetic | MRKT1 | 1 | Jeff | Sponsoring VP? | 1000 | Equals |
| MRKT | Arithmetic | MRKT1 | 1 | Tim | Sponsoring VP? | 1000 | Equals |
| MRKT | Arithmetic | MRKT1 | 4 | Yes | Bill Insert? | 10000 | OR1 |
| MRKT | Arithmetic | MRKT1 | 5 | Yes | Direct Mail? | 10000 | OR1 |
| MRKT | Arithmetic | MRKT1 | 6 | Yes | Newsletter Online? | 10000 | OR1 |
| MRKT | Arithmetic | MRKT2 | 1 | Jeff | Sponsoring VP? | 140 | Equals |
| MRKT | Arithmetic | MRKT2 | 1 | Tim | Sponsoring VP? | 100 | Equals |
| MRKT | Arithmetic | MRKT2 | 2 | Consumer | Sponsoring Pipeline? | 120 | Equals |
| MRKT | Arithmetic | MRKT2 | 2 | Business | Sponsoring Pipeline? | 105 | Equals |
| MRKT | Arithmetic | MRKT2 | 3 | Anna | Initiative Owner? | -20 | Equals |
| MRKT | Arithmetic | MRKT2 | 3 | Maria | Initiative Owner? | 0 | Equals |
| MRKT | Arithmetic | MRKT2 | 7 | Grand Opening | Type of Direct Mail Program? | -45 | Equals |
| MRKT | Arithmetic | MRKT2 | 7 | National | Type of Direct Mail Program? | -30 | Equals |

Fig. 4

| Group | Variable 1 | Variable 1 Type | Operator 1 | Lower Limit 1 | Upper Limit 1 | Variable 2 | Variable 2 Type | Operator 2 | Lower Limit 2 | Upper Limit 2 | Output |
|---|---|---|---|---|---|---|---|---|---|---|---|
| MRKT | MRKT1 | Arithmetic | Range | 10000 | 11000 | MRKT2 | Arithmetic | Range | -65 | 260 | Impact |

DATA STRUCTURE BASED VARIABLE RULES ENGINE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A variable rules engine may output a set of questions to a question responder and may assign a value for each possible response from the responder. The variable rules engine may assign values to variables based on responses received and output the variables, which may indicate insights based on the responses that are unknown to the responder. For example, a project manager answers a set of questions about a project, the variable rules engine assigns various values to variables based on the responses, and the rules engine outputs the variables that indicate estimated impacts that the project may have on available resources.

SUMMARY

In some embodiments, a system is provided for a data structure based variable rules engine. The system includes a processor, a set of questions, a variables data structure comprising values and a set of variables, a results data structure comprising a set of requirements, a user interface, and a rules engine. The user interface outputs the set of questions and receives responses to the set of questions. The rules engine, when executed by the processor, assigns results to the set of variables by combining the responses with the values in the variables data structure, and determines whether the results meet the set of requirements in the results data structure. The user interface also outputs the results in response to a determination that the results meet the set of requirements.

In some embodiments, a computer implemented method is provided for a data structure based variable rules engine. A set of questions is output. Responses are received to the set of questions. Results are assigned to a set of variables by combining the responses with values in a variables data structure. Whether the results meet a set of requirements in a results data structure is determined. The results are output in response to a determination that the results meet the set of requirements.

In some embodiments, a system is provided for a data structure based variable rules engine. The system includes a processor, a set of questions associated with a plurality of time frames, a variables data structure comprising values associated with the plurality of time frames and a set of variables, a results data structure comprising a set of requirements, a user interface, and a rules engine. The user interface outputs the set of questions and receives responses to the set of questions, wherein the responses are associated with the plurality of time-frames. The rules engine, when executed by the processor, assigns results to the set of variables by combining the responses with the values in a variables data structure. The rules engine also determines whether the results meet the set of requirements in the results data structure, wherein the results are associated with the plurality of time frames. The user interface also outputs the results for the plurality of time frames in response to a determination that the results meet the set of requirements.

In some embodiments, a computer implemented method is provided for a data structure based variable rules engine. A set of questions is output. Responses are received to the set of questions. Results are assigned to a set of variables by combining the responses with values in a variables data structure. Assigning results to the set of variables comprises applying an operator to merge a set of corresponding values. The operator is one of an arithmetic operator, a logical operator, and a ranking operator. Applying the ranking operator to merge the set of corresponding values comprises stopping the applying of the ranking operator to a sequence of the set of corresponding values when one of a highest value is detected and the ranking operator is applied to a last value in the sequence of the set of corresponding values. Whether the results meet a set of requirements in a results data structure is determined. The results are output in response to a determination that the results meet the set of requirements.

In some embodiments, a computer implemented method is provided for a data structure based variable rules engine. A set of questions is output. Responses are received to the set of questions. Results are assigned to a set of variables by combining the responses with values in a variables data structure. Assigning results to the set of variables comprises applying an operator to merge a set of corresponding values. The operator is one of an arithmetic operator, a logical operator, and a ranking operator. Applying the logical operator to merge the set of corresponding values comprises stopping the applying of the logical operator to a sequence of the set of corresponding values when one of a false value is detected and the logical operator is applied to a last value in the sequence of the set of corresponding values. Whether the results meet a set of requirements in a results data structure is determined. The results are output in response to a determination that the results meet the set of requirements.

These and other features and advantages will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A variable rules engine may assign values for every possible combination of responses to questions to ensure that no combination of responses results in an error due to an undefined condition. Taking every possible combination of responses into consideration may become quite time-consuming for the highly trained computer programmers who write variable rules engines. During testing of the variable rules engine, much time and effort may be required to verify that every combination of responses is covered. Whenever a user desires to modify the questions or the values, intervention is typically required by such computer programmers. Furthermore, once desired modifications are made by the computer programmers, the variable rules engine typically needs to be recompiled before the modifications take effect, which may require a delay until such recompiling is accomplished.

In some embodiments, systems and methods are provided for a data structure based variable rules engine. In contrast to a variable rules engine written only in a high level language, a data structure based variable rules engine uses various data structures that typical users may easily access and modify to review results based on responses to questions. The data structures for this variable rules engine include a variables data structure and a results data structure, and may also include a questions data structure. A user interface outputs a set of questions, which may be from the questions data structure, and receives responses to the set of questions, such as by a user. The variable rules engine combines the responses to the set of questions in the questions data structure with values in the variables data structure to assign results to a set of variables in the variables data structure. The values may be derived by applying multiple regression analysis to historical data. The variable rules engine also determines whether the results meet a set of requirements in the results data structure. The user interface outputs the results in response to a determination that the results meet the set of requirements. The questions, the responses, the values, and the results may be associated with various time frames to provide detailed results for different periods of time. Because the questions, values, and the set of requirements are listed in natural language in the data structures, typical users may easily identify and modify any questions in the questions data structure, any values in the variables data structure, and/or any set of requirements in the results data structure. This ease of identification and modification enables users to test for themselves the effects of any modifications to questions, values, and/or requirements.

For example, a specific vice-president sponsors projects that require an estimated amount of additional hours to complete for a specific type of project. For this example, the variable rules engine uses the values in the variables data structure to estimate the amount of additional hours to complete the project and uses the set of requirements in the results data structure to identify both the specific type of project and projects sponsored by the specific vice-president. The management style of each vice-president, the groups of people working under each vice-president, and the bandwidth of each group may have affected the amount of hours to complete previous projects. A user may receive the estimated additional hours for the project from the user interface, and modify the values in the variables data structure and the set of requirements in the results data structure to simulate another vice-president sponsoring the project. Without the intervention of any computer programmer or the need to recompile the variable rules engine, the variable rules engine uses the modifications to calculate a new estimate for the project, which the user interface outputs without impacting any other data or any other users of the variable rules engine. The user may evaluate the possible reassignment of the project or any other project variation at the user's own convenience without any delays or need for assistance.

Figure 1:
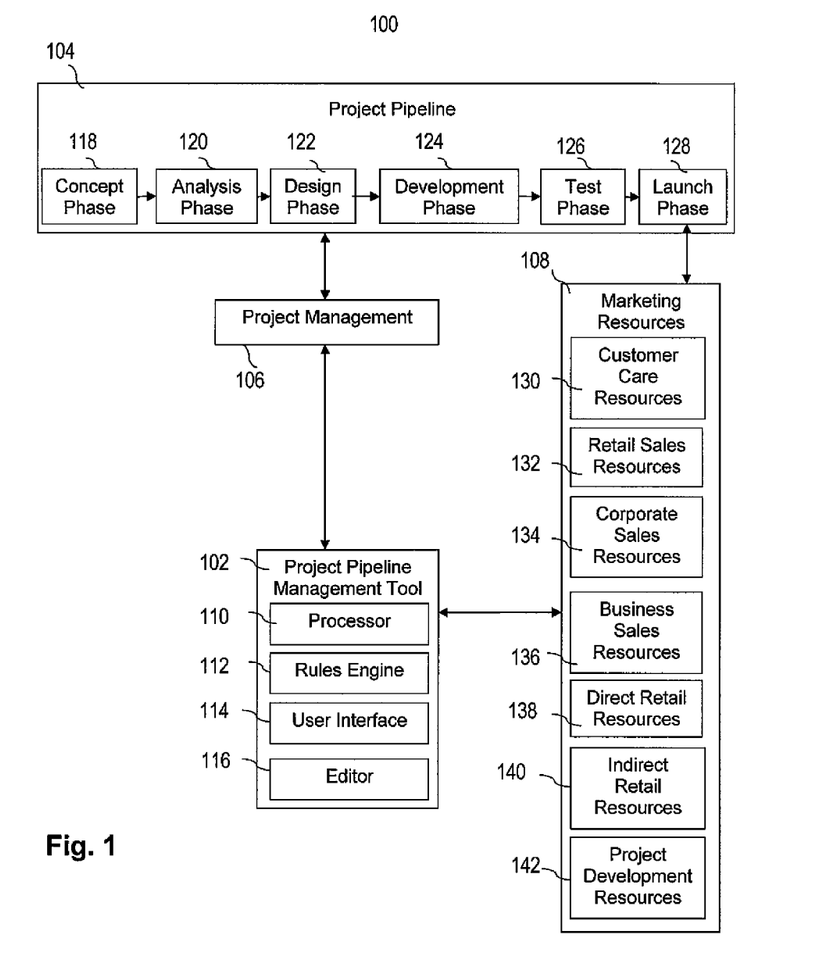
FIG. 1 shows an illustrative data structure based variable rules engine within a project pipeline management system according to some embodiments of the present disclosure.

FIG. 1 shows an illustrative data structure based variable rules engine within a project pipeline management system 100. Although FIG. 1 depicts the data structure based variable rules engine within the project pipeline management system 100 as an illustrative example, the data structure based variable rules engine may function within any type of information technology system. The project pipeline management system 100 includes a project pipeline management tool 102, a project pipeline 104, a project management function 106, and a plurality of marketing resources 108. The project pipeline management tool 102 includes a processor 110, a rules engine 112, which may be referred to as the variable rules engine 112, a user interface 114, and an editor 116.

The project pipeline 104 includes a concept phase 118, an analysis phase 120, a design phase 122, a development phase 124, a test phase 126, and a launch phase 128. The project management function 106 may include project concept initiators, project analyzers, project designers, project developers, and project testers, who may be collectively referred to as project managers. The project management function 106 may also include pipeline managers who are responsible for managing the project pipeline 104, modelers who interview supervisors of the marketing resources 108 to identify questions for project managers and who determine capacities for the marketing resources 108 based on historical data, and table or data structure creators who take information from the modelers to create and maintain data tables or structures that instruct the project pipeline management tool 102 how to estimate project pipeline impacts. The marketing resources 108 include customer care resources 130, retail sales resources 132, corporate sales resources 134, business sales resources 136, direct retail resources 138, indirect retail resources 140, and project development resources 142.

While a project is flowing through the phases 118-128 of the project pipeline 104, any member of the project management function 106, such as a project manager or a pipeline manager, may use the project pipeline management tool 102 to estimate the project's impact on the marketing resources 108. The project manager may respond to questions for the project via the user interface 114 based on the current project phase. The processor 110 may execute the rules engine 112 to estimate the project's impact on each of the marketing resources 108 based on the responses to the questions and a history of previous projects. The editor 116 may be used to update the history of previous projects and to edit the set of questions displayed by the user interface 114.

The phases 118-128 are depicted for the purpose of an illustrative example, as the development process of the project pipeline 104 may include any number and type of phases. For example, a general definition of a development process includes a conceptual phase, a planning phase, a definition and design phase, an implementation phase, and a conversion phase. Different types of projects that employ a development process can include engineering projects, manufacturing projects, computer programming projects, and construction projects. For example, the development process for an engineering project can include a start-up phase, a definition phase, a main phase, and a termination phase. Examples of different project phases for different types of projects can be found in Kerzner, Harold, *Project Management: A Systems Approach to Planning, Scheduling, and Controlling*. New York, N.Y., John Wiley & Sons, 2001, 7$^{th}$ Edition. p. 83. HD69.P75 K47 2000.

The customer care resources 130 may include customer service representatives that respond to customer inquiries and requests. The retail sales resources 132 may include individuals responsible for selling products and services to individual customers. The corporate sales resources 134 may include individuals responsible for selling products and services to organizations, such as corporations. The business sales resources 136 may include individuals responsible for selling products and services to organizations, such as small businesses. The direct retail resources 138 may include individuals responsible for selling products and services directly to individual customers. The indirect retail resources 140 may include individuals responsible for selling products and services to individual customers through an intermediary, such as a third-party vendor. The direct retail resources 138 and the indirect retail resources 140 may be subsets of the retail sales resources 132. The project development resources 142 may include individuals responsible for assembling, packaging, and delivering products produced by projects.

Figure 2:
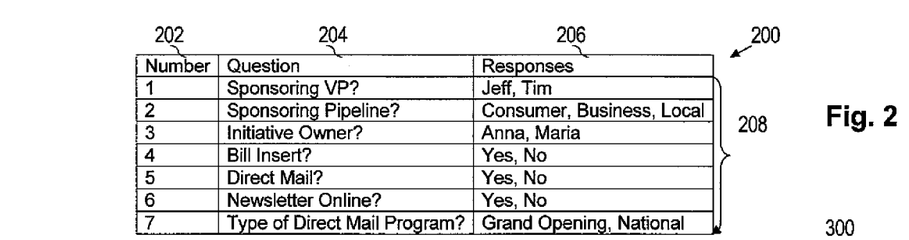
FIG. 2 shows an illustrative questions data structure according to some embodiments of the present disclosure.

Turning now to FIG. 2, an illustrative questions data structure 200 is depicted according to an embodiment of the present disclosure. The questions data structure 200 includes a number column 202, a questions column 204, a responses column 206, and rows 208 with entries associated with each of the columns 202-206. For example, the rows 208 include the corresponding entries "1" for the number column 202, "Sponsoring VP?" for the question column 204, and "Jeff, Tim" for the responses column 206. Continuing this example, a user of the project pipeline management tool 102 may use the user interface 114 and the editor 116 to edit the questions data structure 200. The user interface 114 may output a question number 1 about the sponsoring vice-president for a project, with the names "Jeff" and "Tim" offered as the potential choices in a drop-down menu, to members of the project management function 106. The questions data structure 200 includes other examples of potential responses to questions, such as the three potential responses "Consumer," "Business," or "Local" for question number 2 about a sponsoring pipeline. The questions data structure 200 also includes the example of the two potential responses "Yes," or "No," for question number 5 about a direct mail marketing campaign. By editing the questions data structure 200, a user may enable the user interface 114 to output a set of questions and potential responses for a project to the project management function 106, such that the selected responses received by the user interface 114 may be used to estimate the impact that the project may have on the marketing resources 108.

Figure 3:
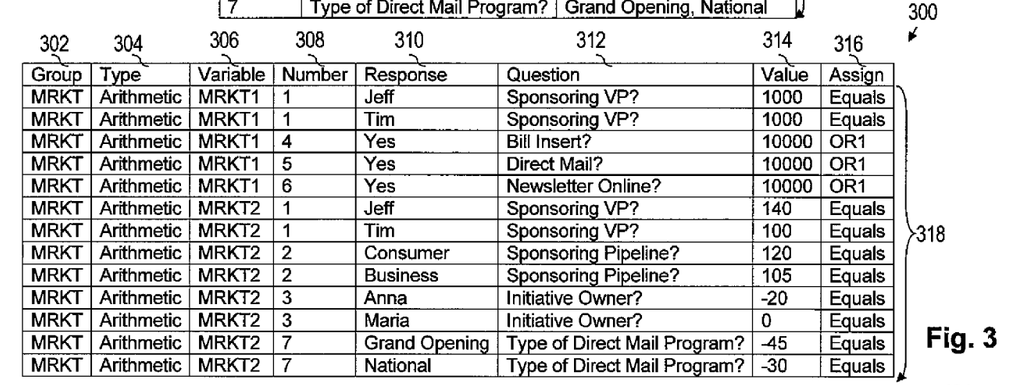
FIG. 3 shows an illustrative variables data structure according to some embodiments of the present disclosure.

Turning now to FIG. 3, an illustrative variables data structure 300 is depicted according to an embodiment of the present disclosure. The variables data structure 300 includes a group column 302, a type column 304, a variable column 306, a number column 308, a response column 310, a question column 312, a value column 314, an assign column 316, and rows 318 with entries associated with each of the columns 302-316. For example, the rows 318 include the corresponding entries "MRKT" for the group column 302, "Arithmetic" for the type column 304, "MRKT1" for the variable column 306, "1" for the number column 308, "Jeff" for the response column 310, "Sponsoring VP" for the question column 312, "1000" for the value column 314, and "equals" for the assign column 316. Continuing this example, a user of the project pipeline management tool 102 may use the user interface 114 and the editor 116 to edit the variables data structure 300. The rules engine 112 may assign the value 314 of "1000" to the variable 306 "MRKT1" when a member of the project management function 106 responds with the response 310 "Jeff" to question number 308 "1" about the sponsoring vice-president for a project. The variables data structure 300 includes other examples, such as assigning the value 314 of "10000" to the variable 306 "MRKT1" when a member of the project management function 106 responds with the response 310 "Yes" to question number 308 "5" about a direct mail marketing campaign for a project. The variables data structure 300 also includes the example of various values 314 that may be assigned to the variable 306 "MRKT2." Different values may be assigned to different variables for the same responses to the same questions. For example, the rules engine 112 may assign the value 314 of "25" to a variable "SALES" when a member of the project management function 106 responds with the same response "Jeff" to the same question about the sponsoring vice-president for the project. In this example, answering "Jeff" to the question about the sponsoring vice-president for the project produces different values for different variables.

The group 302 "MRKT" may also include other variables 306 as well. Each of the variables 306 is defined by a corresponding type 304 that determines how a set of corresponding values 314 associated with any specific variable 306 may be merged together to assign a result to the specific variable 306. For example, the types 304 may identify an arithmetic operator, which specifies that the values 314 may be added or subtracted with each other, a logical operator, which specifies that the values 314 may be logically merged together by an "and" operation or an "or" operation, or a ranking operator, which determines a result by selecting a highest value or a lowest value from the set of values 314.

A user may edit the variables data structure 300 to enter values 314 that have a specific significance based on arithmetic, logic, or ranking or to specify an arithmetic operation be performed. For example, a user may determine that when a consumer group is the sponsoring pipeline for a project, the value 314 of "120" may be an approximation of the number of hours that may be added to the workload for the customer care resources 130. In another example, a value 314 of "10000" may indicate plans for a project to have a direct mail marketing campaign, where the value 314 of "10000" has no relationship to the number of hours that may be added to the workload for the customer care resources 130. The value 314 of "10000" may be a placeholder that identifies a type of marketing campaign by setting a number in the ten thousands placeholder. A user may determine whether a variable 306 is associated with a specific type of marketing campaign by evaluating whether the variable 306 has a value 314 that includes a number in the ten thousands placeholder. The assign column 316 indicates how any specific values 314 may be assigned to a specific variable 306, such as when the project management function 106 selects one of the responses 206 that equals the response 310. In another example, the assign column 316 includes "OR1," which indicates that if any of the responses 206 equals the response 310 for the questions 4, 5, or 6, the value 314 of "10000" is assigned to the variable 306 "MRKT1." By editing the variables data structure 300, a user may enable the rules engine 112 to assign values 314 to the variables 306 to indicate whether the responses 310 indicate that certain conditions have been met for a project to have an impact on the marketing resources 108 and to estimate the impact that the project may have on the marketing resources 108.

Figure 4:
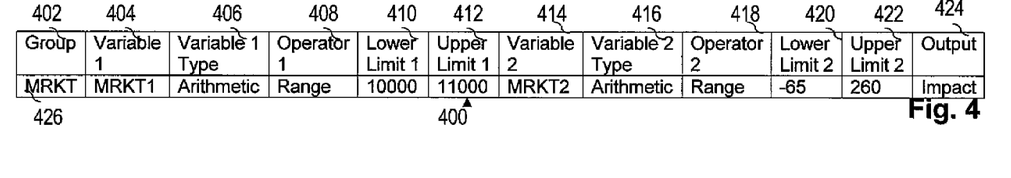
FIG. 4 shows an illustrative results data structure according to some embodiments of the present disclosure.

Turning now to FIG. 4, an illustrative results data structure 400 is depicted according to an embodiment of the present disclosure. The results data structure 400 includes a group column 402, a variable 1 column 404, a variable 1 type column 406, an operator 1 column 408, a lower limit 1 column 410, an upper limit 1 column 412, a variable 2 column 414, a variable 2 type column 416, an operator 2 column 418, a lower limit 2 column 420, an upper limit 2 column 422, an output column 424, and a row 426 with entries associated with each of the columns 402-424. Although depicted with only one row 426, the results data structure 400 may include any number of rows 426. In this example, the row 426 includes the corresponding entries "MRKT" for the group column 402, "MRKT1" for the variable 1 column 404, "Arithmetic" for the variable 1 type column 406, "Range" for the operator 1 column 408, "10000" for the lower limit 1 column 410, and "11000" for the upper limit 1 column 412. Further to this example, the row 426 also includes the corresponding entries "MRKT2" for the variable 2 column 414, "Arithmetic" for the variable 2 type column 416, "Range" for the operator 2 column 418, "−65" for the lower limit 2 column 420, "260" for the upper limit 2 column 422, and "Impact" for the output column 424. Continuing this example, a user of the project pipeline management tool 102 may use the user interface 114 and the editor 116 to edit the results data structure 400. The rules engine 112 may output results for the group 402 "MRKT" only if the variable 1 404 "MRKT1" is within the range of the lower limit 1 410 of "10000" and the upper limit 1 412 of "11000" and the variable 2 414 "MRKT2" is within the range of the lower limit 2 420 of "−65" and the upper limit 2 422 of "260." By editing the results data structure 400, a user may enable the user interface 114 to output a calculated numerical value, such as the variable 2 414 "MRKT2" which estimates a project's impact on the marketing resources 108, if certain conditions are indicated, such as by the variable 1 404 "MRKT1" which indicates whether the project has a sponsoring vice-president and whether the project is associated with a specific type of marketing campaign.

Figure 5:
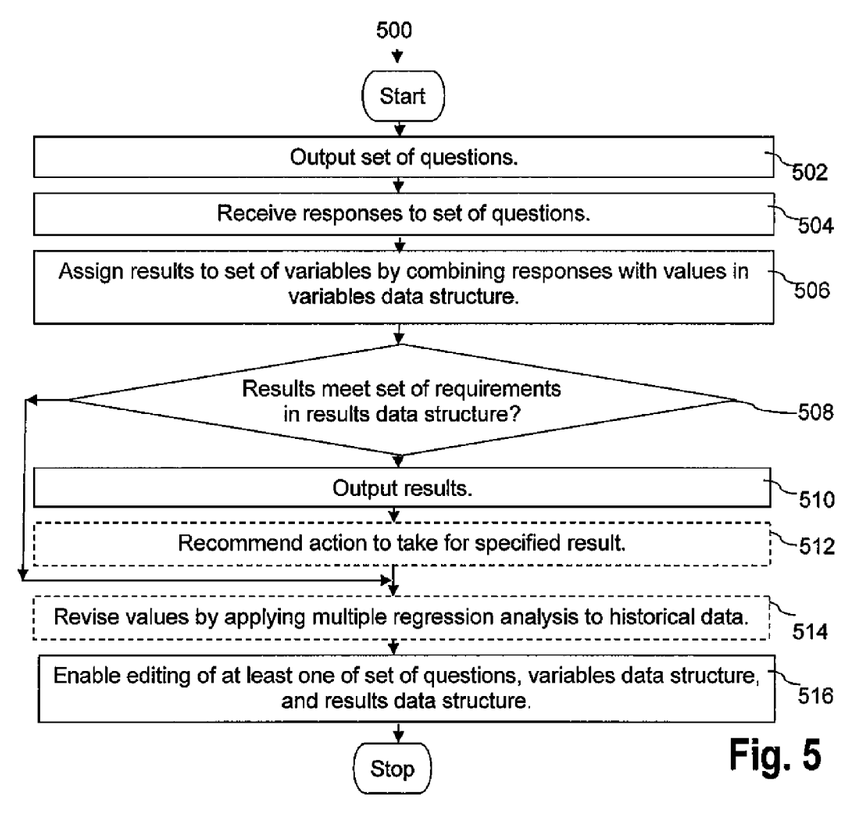
FIG. 5 shows an illustrative method according to some embodiments of the present disclosure.

Turning now to FIG. 5, an illustrative method 500 is depicted according to an embodiment of the present disclosure. Executing the method 500 enables the rules engine 112 to assign results based the questions data structure 200, the variables data structure 300 and the results data structure 400. The rules engine 112 accesses the responses to the set of questions in the questions data structure 200. The rules engine 112 combines the responses with values in the variables data structure 300 to assign results to a set of variables in the variables data structure 300. The rules engine 112 determines whether the results meet a set of requirements in the results data structure 400. The user interface 114 outputs the results if the rules engine 112 determines that the results meet the set of requirements in the results data structure 400.

In box 502, a set of questions is output. For example, during the concept phase 118 for a mobile phone project, the user interface 114 outputs the questions from the questions data structure 200 to a project manager, where the project manager responds to the questions for a new mobile phone project that is scheduled for the launch phase 128 during any of the first three weeks of December. The questions 204 and the acceptable responses 206 are listed in the questions data structure 200, which may be implemented by a spreadsheet. Although this example depicts the user interface 114 outputting questions during the concept phase 118, the user interface 114 may output questions during any and/or all of the phases 118-128. The questions may be based on interviews between modelers and supervisors for each of the resources 130-142 concerning the impacts of previous projects on the resources 130-142. The project manager may answer the questions 204 in any order, and not every one of the general questions 204 may apply to the current project. For example, if the project manager is answering the presented questions 204 for a project that is developing a consumer product, the project manager may not need to answer any questions 204 associated with developing business products. The project manager may also answer the same question that applies to various time frames, such as the different marketing strategies for each of the weeks in December during the launch phase 128 of the new mobile phone project. The project manager may not know how the answer to any of these questions 204 will affect estimates of project pipeline impacts on any of the marketing resources 108.

In box 504, responses to the set of questions are received. For example, the project manager selects the responses 206 to the set of questions 204 for the new mobile phone project for each of the various time frames via the user interface 114. The rules engine 112 may compile and output a narrative based on the responses 206. This narrative may enable the project manager to verify that the responses 206 entered accurately reflect the requirements for the project.

In box 506, results are assigned to a set of variables by combining the responses with values in a variables data structure. For example, the rules engine 112 assigns results to the variables 306 by combining the responses 310 with the values 314 in the variables data structure 300 that is implemented by a spreadsheet, wherein each of the values 314 and each of the results may be associated with the various time frames. Continuing this example, during the concept phase 118 for the new mobile phone project, the rules engine 112 combines the project manager's response 310 "Jeff" to the question 312 "Sponsoring VP?" with the value 314 of "140" derived from the history of previous projects to the variable 306 "MRKT2." The variable 306 "MRKT2" estimates a project pipeline impact of an additional 140 hours added to the normal workload capacity during the second week of December for the customer care resources 130. The history of previous projects may include historical project pipeline impacts and historical characteristics found by modelers to be significantly correlated with the historical project pipeline impacts. The information for the historical projects may be entered by modelers after those projects have been completed, but the information may also be entered by project managers before or during the project and supplemented after the project has been completed.

If the project manager's response 310 is "Tim" to the question 312 "Sponsoring VP," the rules engine 112 combines the value 314 of "120" with the variable 306 "MRKT2." In another example, the rules engine 112 combines the project manager's response 310 "Yes" to the question 312 "Direct Mail?" with the value 314 of "10000" for the variable 306 "MRKT1," which serves as a placeholder that indicates the project uses direct mail or a similar marketing campaign.

In addition to numerical values such as "140," the values 314 may include character string values, such as "low," "medium," and "high," which may describe a level of impact on resources. The rules engine 112 may stop combining responses with values associated with a ranking operator when a desired value is detected or the ranking operator is applied to a last response in a sequence of responses associated with the ranking operator. For example, the rules engine 112 is selecting the highest value from the values 314 associated with the questions with the number 308 of "8," "9," and "10." In this example, the rules engine 112 does not have to combine responses with values associated with the ranking operator for the questions with the number 308 of "9" or "10" after detecting the value 314 of "high" associated with the response to the question with the number 308 of "8." The rules engine also stops combining responses with values associated with the ranking operator after combining the value with the response associated with the question with the number 308 of "10," which is the last question for this ranking operator. Similarly, the rules engine 112 may stop combining responses with values associated with a logical operator to a sequence of a set of questions associated with the logical operator when a false value is detected or the logical operator is applied to the response to the last question in the sequence of the set of questions associated with the logical operator. For example, the rules engine 112 is selecting the true value from the values 314 associated with questions with the number 308 of "11," "12," and "13." In this example, the rules engine 112 does not have to combine responses with values associated with the logical operator for the response to the question with the number 308 of "13" after detecting the value 314 of "false" associated with the question with the number 308 of "12."

The values 314 used to estimate the project pipeline impact on the marketing resources 108 may be identified by the table or data structure creators using a number of different techniques. A multiple regression analysis may be applied to the history of the previous projects to determine the values 314 which may be entered into the variables data structure 300 by the user. Multiple regression analysis refers to analysis of a regression on more than two variables. This approach consists of gathering historical data regarding a number of characteristics known to impact the marketing resources 108, characteristics which may be based on the interviews between modelers and supervisors of the resources 130-142.

The characteristics or values 314 are viewed as independent variables associated with project impact as part of a statistical analysis. Multiple regression analysis can begin with a set of all the potentially relevant variables and eliminate variables from this set of potentially relevant variables, based on a statistical significance test. Statistical analysis is performed using a multiple regression analysis method such as step-wise regression or backward elimination regression to reduce the overall set of values 314 to those which are statistically significant. The statistical significance test can analyze whether eliminating a specific variable resulted in a significant change in the predicted numerical value for an estimate. This analysis can determine whether the specific variable will be included or excluded for making estimates. The statistical significance test then repeats the analysis with a subset of the variables. The statistical significance test can also test the results of adding a previously excluded variable back into the set of variables used for the model. Multiple regression analysis can result in calculating a parameter value for each variable included in the model. Variables not included in the model, such as variables for responses that correspond to no measurable impact on the model, have an implied parameter value of zero. The predicted value for each data point in the model may be calculated by multiplying each variable for a data point by the corresponding parameter for the variable and then summing the products of each multiplication. Often a baseline offset is also added. For example, after summing the products of each multiplication for a model that estimates potential increases and decreases to an average project completion time, the summed products are added to a baseline offset of 6 months, which is an estimate of the average project completion time. The statistically significant values are used as the values 314 to estimate a project impact. Additional details on multiple regression analysis can be found in Berenson, M. L., Krehbiel, T. C., and Levine, D. M., *Basic Business Statistics: Concepts and Applications*. Upper Saddle River, N.J., Pearson/Prentice Hall, 2005, 8$^{th}$ Edition. p. 550-633. HF1017.B38 2001.

In box 508, whether the results meet a set of requirements in a results data structure is determined. For example, the rules engine 112 determines whether the results meet a set of requirements in the results data structure 400, which may be implemented by a spreadsheet. The results meet a requirement if the results equal a specified value, such as equaling the value of "10000," or if the results are within a specified range of values, such as between the lower limit 2 420 of "−65" and the upper limit 2 422 of "260." The rules engine 112 may compare variables to the lower and upper limits for each variable in a group to determine whether the variables meet the requirements. For example, when the variable 1 404 "MRKT1" has a value within the range from the lower limit 1 410 of "10000" to the upper limit 1 412 of "11000," the project uses a marketing campaign that is based on either "Bill Insert," "Direct Mail," or "Newsletter Online." In another example, when the variable 2 414 "MRKT2" has a value within the range from the lower limit 2 420 of "−65" and the upper limit 2 422 of "260," the variable 2 414 "MRKT2" estimates the project's impact on the marketing resources 108.

Only when each variable meets each requirement does the rules engine 112 output the values associated with the variables. In this example, the variable 1 404 "MRKT1" identifies whether specified conditions have been met and the variable 2 414 "MRKT2" estimates the impact on the marketing resources 108 when these conditions have been met. Although the lower limit 2 420 of "−65" and the upper limit 2 422 of "260," equal the lowest and highest possible values for variable 2 414 "MRKT2" in this example, the lower and upper limits 420-422 may be set to a narrower range of values, such that the rules engine 112 outputs results only when the variable 2 414 "MRKT2" is within the narrower range. If the rules engine 112 determines that the results meet the set of requirements in the results data structure 400, the method continues to box 510. If the rules engine 112 determines that the results do not meet the set of requirements in the results data structure 400, the method proceeds to box 514.

In box 510, the results are output. For example, the user interface 114 outputs the results for the new mobile phone project, such as "MRKT=11260." In this example, group 402 "MRKT" includes both variable 1 404 "MRKT1," which equals "11000", and variable 2 414 "MRKT2," which equals "260." Variable 1 404 "MRKT1" has a value of "11000," which indicates that a specific type of marketing campaign is used and that the project is sponsored by a vice-president. Variable 2 414 "MRKT2" is an estimated project pipeline impact of "260" additional hours for the marketing resources 108 during the second week of December, which is based on "140" additional hours because "Jeff" is the sponsoring VP and "120" additional hours because the sponsoring pipeline is "Consumer." The user interface 114 may also output results that are converted to text, such as "Project has Jeff as a vice-president sponsor, uses direct mail marketing campaign, and is estimated to require 260 additional hours for the marketing resources 108 during the second week of December." In another example, the user interface 114 outputs results that indicate a low level of impact during the first week of December, a medium level of impact during the second week of December, and a high level of impact for the third week of December, with each impact for the retail sales resources 132.

In box 512, an action to take for a specified result is optionally recommended. Although the project pipeline management tool 102 may not reduce the anticipated number of customer inquiries and requests in response to the launch of a project, the project pipeline management tool 102 may address a limited workload capacity through making a recommendation. For example, the rules engine 112 recommends for a pipeline manager to instruct the project manager to reschedule the launch phase 128 of the new mobile phone project due to the limited workload capacity of the customer care resources 130 during the second week of December. Examples of other actions include reassigning a project, phasing out support for a previous project, reallocating a project pipeline impact between timeframes, training marketing resources, selectively training selected marketing resources, adding short term-marketing resources, and prioritizing among accomplishing project deliverables inviting the project manager for potentially conflicting projects to a project coordinating meeting. Actions may also include modifying the new mobile phone project based on a conflict between projects, based on a dependency of one project on another, based on a synergy from developing projects, or based on a risk that a technology that supports the new mobile phone project will become outdated.

In box 514, the values are optionally revised by applying multiple regression analysis to historical data. For example, based on information from the modelers, a pipeline manager instructs the rules engine 112 to revise the values 314 for estimating project pipeline impacts by applying multiple regression analysis to historical data for a recently completed operating system correction project.

In box 516, an editor enables editing of at least one of the set of questions, the variables data structure, and the results data structure. For example, the editor 116 enables the pipeline manager to edit the set of questions in the questions data structure 200 to include a question related to the complexity of a project's operating system based on interviews with supervisors of the marketing resources 108. In another example, the pipeline manager edits the variables data structure 300 to modify the value 314 of "140" to "150" based on information that the pipeline manager receives regarding the projects that Jeff sponsors. In yet another example, the pipeline manager edits the results data structure 400 to modify the upper limit 422 from "260" to "270" based on an updated history of previous projects to enable the upper limit 422 to cover the new range based on the modification of the value 314 of "140" to "150." The rules engine 112 may retain the original results as well as the results based on any edits. For example, the rules engine 112 may output the original results based on 140 additional hours for projects sponsored by Jeff and also output the revised results based on 150 additional hours for projects sponsored by Jeff.

The rules engine 112 may output the results without recompiling following the editing of the set of questions in the questions data structure 200, the variables data structure 300, and/or the results data structure 400. For example, the user interface 114 outputs the revised results based on 150 additional hours for projects sponsored by Jeff without recompiling following the editing of the variables data structure 300 and the results data structure 400. Without the need to recompile following editing of the questions data structure 200, the variables data structure 300, and/or the results data structure 400, the rules engine 112 enables the pipeline manager to investigate how results are affected by various edits without requiring the intervention of a highly trained computer programmer.

Figure 6:
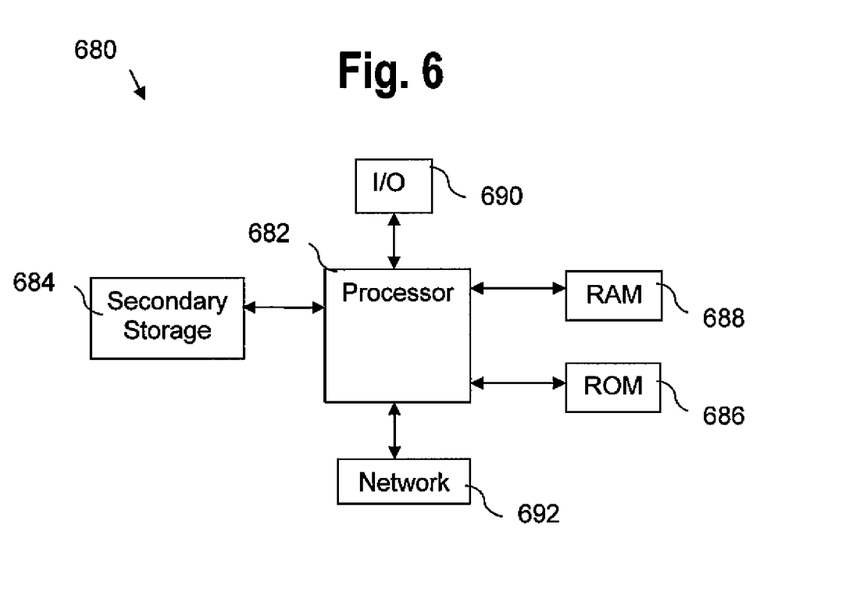
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer implemented method for a data structure based variable rules engine, comprising:
   outputting a set of questions;
   receiving responses to the set of questions;
   assigning results to a set of variables by combining the responses with values in a variables data structure, wherein assigning the results to the set of variables comprises applying an operator to merge a set of corresponding values, wherein the operator is one of an arithmetic operator, a logical operator, and a ranking operator, and wherein applying the ranking operator to merge the set of corresponding values comprises stopping the applying of the ranking operator to a sequence of the set of corresponding values when one of a highest value is detected and the ranking operator is applied to a last value in the sequence of the set of corresponding values;
   determining whether the results meet a set of requirements in a results data structure; and
   outputting the results in response to a determination that the results meet the set of requirements.

2. The computer implemented method of claim 1, wherein combining the responses with values in a variables data structure comprises assigning a corresponding value in the variables data structure to each response.

3. The computer implemented method of claim 1, further comprising recommending an action to take for a specified result.

4. A computer implemented method for a data structure based variable rules engine, comprising:
   outputting a set of questions;
   receiving responses to the set of questions;
   assigning results to a set of variables by combining the responses with values in a variables data structure, wherein assigning the results to the set of variables comprises applying an operator to merge a set of corresponding values, wherein the operator is one of an arithmetic operator, a logical operator, and a ranking operator, and wherein applying the logical operator to merge the set of corresponding values comprises stopping the applying of the logical operator to a sequence of the set of corresponding values when one of a false value is detected and the logical operator is applied to a last value in the sequence of the set of corresponding values;
   determining whether the results meet a set of requirements in a results data structure; and
   outputting the results in response to a determination that the results meet the set of requirements.

5. A system for a data structure based variable rules engine that comprises:
   a processor;
   a set of questions associated with a plurality of time frames;
   a variables data structure comprising values associated with the plurality of time frames and a set of variables;
   a results data structure comprising a set of requirements;
   a user interface to output the set of questions and to receive responses to the set of questions, wherein the responses are associated with the plurality of time frames; and
   a rules engine, when executed by the processor, to assign results to the set of variables by combining the responses with the values in the variables data structure, and to determine whether the results meet the set of requirements in the results data structure, wherein the results are associated with the plurality of time frames;
   wherein the user interface outputs the results for the plurality of time frames in response to a determination that the results meet the set of requirements.

6. The system of claim 5, wherein the values are based on historical data.

7. The system of claim 5, wherein the rules engine is configured to revise the values by applying multiple regression analysis to historical data.

* * * * *